(12) United States Patent
Tsuchiya et al.

(10) Patent No.: US 8,729,849 B2
(45) Date of Patent: May 20, 2014

(54) MOTOR CONTROL CIRCUIT AND SERVO DEVICE PROVIDED WITH THE SAME

(75) Inventors: Hiroyuki Tsuchiya, Chiba (JP); Yoshihisa Yamada, Gunma (JP)

(73) Assignees: Futaba Corporation (JP); Semiconductor Components Industries, LLC, Phoenix, AZ (US)

( * ) Notice: Subject to any disclaimer, the term of this patent is extended or adjusted under 35 U.S.C. 154(b) by 66 days.

(21) Appl. No.: 13/612,092

(22) Filed: Sep. 12, 2012

(65) Prior Publication Data

US 2013/0076288 A1    Mar. 28, 2013

(30) Foreign Application Priority Data

Sep. 22, 2011    (JP) ................. 2011-207559

(51) Int. Cl.
*G05B 11/28* (2006.01)
*G11B 7/0045* (2006.01)
*G05B 19/402* (2006.01)

(52) U.S. Cl.
CPC .......... *G11B 7/00456* (2013.01); *G05B 19/402* (2013.01)
USPC ............ 318/599; 318/560; 318/603; 318/607

(58) Field of Classification Search
USPC ................. 318/560, 562, 599, 603, 606, 607
See application file for complete search history.

(56) References Cited

U.S. PATENT DOCUMENTS

| | | | | |
|---|---|---|---|---|
| 5,170,108 A * | 12/1992 | Peterson et al. | ............. | 318/469 |
| 5,796,230 A * | 8/1998 | Heining | ................. | 318/599 |
| 6,897,630 B2 * | 5/2005 | Murray et al. | ................ | 318/434 |
| 7,609,021 B2 * | 10/2009 | Bay et al. | ...................... | 318/599 |
| 7,696,713 B2 * | 4/2010 | Komatsu et al. | ............. | 318/672 |
| 8,606,429 B2 * | 12/2013 | Lin et al. | ...................... | 700/304 |

FOREIGN PATENT DOCUMENTS

JP      09-187578       7/1997

* cited by examiner

*Primary Examiner* — Bentsu Ro
*Assistant Examiner* — Thai Dinh
(74) *Attorney, Agent, or Firm* — Quarles & Brady LLP (57) ABSTRACT

When a servo device receives the frequency setting signal as a control signal through the receiver from the transmitter, it select the information in conformity with the received frequency setting signal among the driving frequency setting information as stored in advance. When the handling signal is input as the control signal by the transmitter, the servo device is configured to transform the difference data taken synchronously with the difference data timing signal from the pulse width comparison part into the selected driving frequency. The servo device is configured to generate the driving signal from the transformed difference data signal of the desired corresponding count value range, and to perform drive control the driving feature.

4 Claims, 6 Drawing Sheets

MOTOR CONTROL CIRCUIT AND SERVO DEVICE PROVIDED WITH THE SAME

FIELD OF THE INVENTION

The present application claims priority of Japanese Patent Application No. 2011-207559 filed on Sep. 22, 2011, the disclosure of which is expressly incorporated by reference herein in its entirety.

The invention relates to a motor control circuit for performing drive control of a servo device which is mounted to an object to be handled. The object to be handled may include a variety of models such as a model helicopter, a model airplane, a model vehicle, or a model vessel, or industrial machinery for unmanned operation, and is remotely handled. Moreover, the invention also relates to a servo device provided with the motor control circuit.

2. Description of the Related Art

A servo device is configured to correctly drive an operating part or site in accordance with an input signal. In the case of remote-control device which is configured to remotely handle the object to be handled via wireless radio communication, such a servo device is mounted to an objected to be handled. Moreover, the servo device can be used as a driving feature such that each operation part or site (for a model airplane, a ladder, an elevator, an engine throttle, an aileron or like) can be accurately driven in accordance with the amount of operation of user at a transmitter side. For reference, JP H9-187578 (A) describes this type of the servo device.

During the handling of the object to be handled, the handling sense or feeling mainly depends on the preferences of individual users. For example, a user likes an analog servo device in which the driving frequency of a motor is synchronized with the transmission cycle of a transmitter (i.e., the pulse cycle of the signal from a receiver), and which is not suited for precise operation or handling, but allows for high torque during low-speed rotation of a motor. On the other hand, another user likes a digital servo device in which the driving frequency of a motor is made shorter than the transmission cycle of a transmitter, thus allowing for less minimal driving pulse width for motor driving in comparison with the analog servo device, as well as, high level of responsiveness.

In the conventional servo device as described in JP H9-187578 (A), a driving frequency is fixed for each device. Accordingly, if the object is intended to be handled with a desired handling sense or feeling of an individual user, a separate servo device which meets the desired handling sense or feeling should be provided on a case-by-case basis, which is cumbersome job.

SUMMARY OF THE INVENTION

In view of the drawbacks or problems, the present invention is provided. The objective of the invention is to provide a motor control circuit being capable of properly altering the driving frequency of the servo device with ease, as well as, a servo device having the circuit mounted therein.

In one aspect, the invention provides a motor control circuit for generating a driving signal and performing drive control of a motor. The driving signal is generated by using difference data which is obtained by subtracting a pulse width of a position signal detected from a rotational position of an output axis of the motor from a pulse width of handling signal for controlling a driving amount of the motor. The motor control circuit includes:

a pulse generating counter configured to count up to a desired value synchronously with a difference data timing signal instructing a timing for updating the difference data;

a count value range setting part configured to output a count value range signal for setting the count value range to be used among the count value as counted by the pulse generating counter, in accordance with the currently selected driving frequency setting information among the driving frequency setting information for transforming the driving signal of the motor into a desired driving frequency;

a difference data transforming part configured to output a transformed difference data signal which is obtained by frequency transformation of the difference data, which is taken synchronously with the difference data timing signal, such that the driving frequency corresponding to the currently selected driving frequency setting information is obtained, and a pulse generating part configured to generate and output the transformed difference data signal as a driving signal corresponding to the driving frequency of the currently selected driving frequency setting information within the count value range as set by the count value range signal from the count value range setting part.

Preferably, the driving frequency setting information may include (i) a count value range setting information instructing the count value range in which the transformed difference data signal is used in accordance with the selected driving frequency among the count value as counted synchronously with the difference data timing signal, and (ii) a difference data transformation setting information for frequency transformation of the difference data by multiplying the difference data by $2^n$ (wherein n is a positive or negative integer) such that the driving frequency as selected in conformity with the count value range setting information is obtained. (i) The count value range setting information and (ii) the difference data transformation setting information are stored in associated with each other with respect to each desired frequency.

In another aspect, the invention provides a servo device, which has a control part configured to receive a handling signal corresponding to a desired operational amount of an operating part of a transmitter, and to transform the handling signal to a driving signal so as to perform drive control of a driving feature. The control part includes:

a pulse generating counter configured to count up to a desired value of difference data synchronously with a difference data timing signal instructing a timing for updating the difference data, the difference data being obtained by subtracting a pulse width of a position signal detected from a rotational position of an output axis of the driving feature from a pulse width of handling signal;

a count value range setting part configured to output a count value range signal for setting the count value range to be used among the count value as counted by the pulse generating counter, in accordance with the currently selected driving frequency setting information among the driving frequency setting information for transforming the driving signal of the motor into a desired driving frequency;

a difference data transforming part configured to output a transformed difference data signal which is obtained by frequency transformation of the difference data, which is taken synchronously with the difference data timing signal, such that the driving frequency corresponding to the currently selected driving frequency setting information is obtained, and a pulse generating part configured to generate and output the transformed difference data signal as a driving signal corresponding to the driving frequency of the currently selected driving frequency setting information within the count value range as set by the count value range signal from the count value range setting part.

Preferably, the driving frequency setting information may include (i) a count value range setting information instructing the count value range in which the transformed difference data signal is used in accordance with the selected driving frequency among the count value as counted synchronously with the difference data timing signal, and (ii) a difference data transformation setting information for frequency transformation of the difference data by multiplying the difference data by $2^n$ (wherein n is a positive or negative integer) such that the driving frequency as selected in conformity with the count value range setting information is obtained. (i) The count value range setting information and (ii) the difference data transformation setting information are stored in associated with each other with respect to each desired frequency.

In accordance with the invention, a handling signal from a transmitter can be transformed to a driving frequency as arbitrarily set in accordance with desired handling sense or feeling of a user. As a result, a plurality of servo devices is not needed for each moving parts. Furthermore, even if there is any change in usage environment, the condition of the object to be handled, weather or the like, the driving properties or performances can be adjusted flexibly and easily without need for setting by connecting to a variety of setting devices such as PC on a case-by-case basis.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The invention may be put into practice in various ways and a number of embodiments will be described by way of example to illustrate the invention with reference to the accompanying drawings, in which.

DETAILED DESCRIPTION OF THE PREFERRED EMBODIMENTS

<Constitution of Apparatus>

Firstly referring to FIGS. 1-4, a remote-control apparatus having a servo device to which a motor control circuit in accordance with the invention is mounted is hereinafter described in detail.

Figure 1:
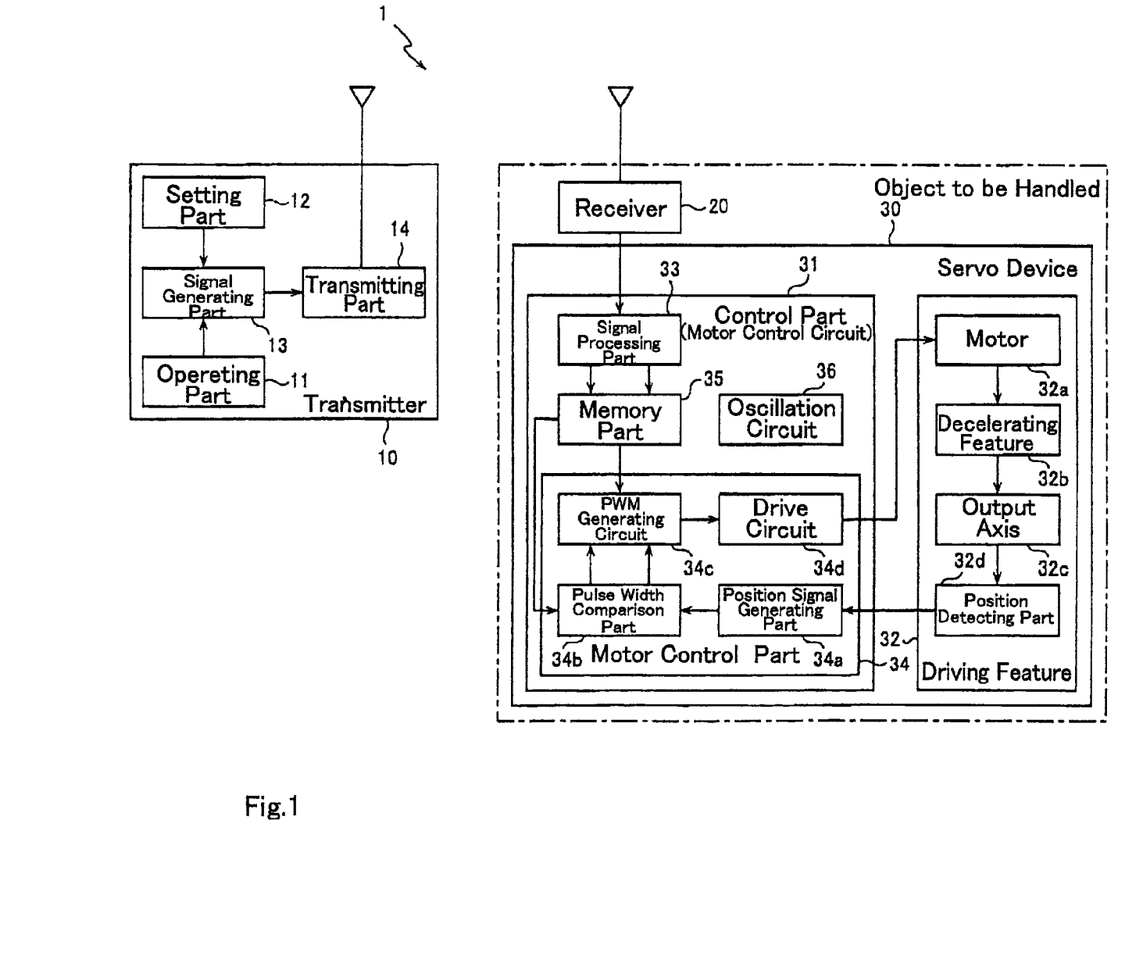
FIG. 1 is a functional block diagram showing the outlined constitution of a remote-control apparatus having a servo device to which a motor control circuit in accordance with the invention is mounted.

Referring to FIG. 1, an embodiment of the remote-control apparatus 1 includes a transmitter 10 generating a variety of control signals (such as including handling signal and frequency setting signal) which is transmitted to an object to be handled (such as industrial machineries or a variety of models such as a helicopter, an airplane, a car, a vessel, or a robot), and a servo device 30 mounted to the object to be handled, and configured to control the movement (i.e., an amount of movement) of a movable part, or to set the desired driving frequency in accordance with the control signal which is received by a receiver 20.

The receiver 20 may be connected to a plurality of servo devices 30. Moreover, the receiver 20 may be optionally connected to other devices such as a gyroscopic device and a motor controller than the servo device 30.

<Transmitter>

The transmitter 10 is configured to generate and transmit a control signal for handling or maneuvering the servo device 30 mounted in an object to be handled. The transmitter 10 includes an operating part 11, a setting part 12, a signal generating part 13, and a transmitting part 14.

The operating part 11 is formed of a variety of levers such as a stick lever or switches, and is configured to output an analog signal regarding an operation (i.e., an amount of operation) such as left, right, up and down operation of a lever, or holding a switch down operation at the signal generating part 13. The analog signal can be used as an operational signal with respect to each of channels.

The setting part 12 may be formed of a variety of keys such as an editing key or a touch panel which are provided on the display screen of a display apparatus such as a liquid crystal display, and is manipulated when a variety of settings or altering of the setting is needed. In particular, a driving frequency setting screen of the servo device 30 is displayed on the display screen of the display apparatus. A user can manipulate or operate the operational keys or touch panel in view of the above display screen, thereby selecting a desired driving frequency in dependence on the handling sense during the handling. For reference, in the drawn embodiment "Setting 1" to "Setting 4" corresponding to four driving frequencies (i.e., "Driving frequency 1" to "Driving frequency 4") can be selected. Moreover, a digital signal, which corresponds to the set contents, is output as a setting and manipulation signal at the signal generating part 13.

The signal generating part 13 is formed of a known signal generating circuit which generates a control signal that is output for the servo device 30 via the transmitting part 14 when the manipulation signal from the operating part 11 or setting and manipulation signal from the setting part 12 is input. The control signal may be the handling signal or frequency setting signal. In particular, the signal generating part 13 is configured to transform the manipulation signal from the operating part 11 (A/D transformation), and to perform a signal process such that a signal can be transmitted at a desired time-shared cycle (for example, a pulse width of 1520 μS plus or minus 600 μS at one transmission cycle of 14-20 ms. The control signal thus obtained can be output as a handling signal (i.e., PWM signal) for performing drive control of a driving feature 32 at the transmitting part 14. For reference, the driving feature 32 will be hereinafter described.

Furthermore, the signal generating part 13 is configured to perform signal process such that serial data can be obtained including the setting and manipulation signal which is obtained from the setting part 12. The control signal generated by the above signal process is output as a frequency setting signal at the transmitting part 14.

After the transmitting part 14 modulates the control signal from the signal generating part 13 (i.e., handling signal or frequency setting signal) by way of high-frequency modulation (for example, AM modulation or FM modulation), spectral diffusion or the like, it transmits the modulated signal as a radio wave from an antenna via the receiver 20 to the servo device 30.

<Receiver>

Receiver 20 is configured to amplify the radio wave received from the transmitter 10, and to demodulate the radio wave into the control signal. The control signal thus obtained is output at the servo device 30. This type of the receiver 20 is known.

<Servo Device>

The servo device 30 is configured to independently perform drive control of the moving part(s) of the object to be operated in accordance with the handling signal received via the receiver 20. In a case where the object to be operated is a model airplane, the moving parts may be a ladder, an aileron, an elevator, an engine throttle or the like. The servo device 30 includes a control part 31 and a driving feature 32.

The control part 31 can be a control LSI (Large Scale Integration) configured to perform drive control of the driving feature 32 in dependence on the handling signal from the transmitter 10. In other words, the control part 31 may function as a motor control circuit. The control part 31 includes a signal processing part 33, a motor control part 34, and a memory part 35. Furthermore, the drive control of each parts of the control part 31 is actuated synchronously with clock signal from a known oscillation circuit 36 which has, for example, a crystal oscillator or a frequency dividing circuit.

The signal processing part 33 is configured to detect a pulse width of the control signal which is input via the receiver 20, and to specify the type of the input control signal in dependence on the detected pulse width information so as to generate the handling signal or frequency setting signal, and temporarily hold it. Moreover, the signal processing part 33 is configured to extract the temporarily held handling signal or frequency setting signal, thereby performing writing at the desired area of the memory part 35 (i.e., a handling signal memorizing means 35a or a frequency information memorizing means 35b).

The motor control part 34 has a position information generating part 34a configured to generate and output a position signal which is a pulse signal associated with a position information from a position detecting part 32d (i.e., information representing the rotation location of the output axis 32c of the driving feature 32), a pulse width comparison part 34b configured to generate and output a difference data timing signal which corresponds to a timing signal synchronized with a difference data between the pulse width associated with the handling signal as stored in the memory part 35 (i.e., a target value) and the pulse width of the position signal (i.e., a measured value), and a timing for updating the difference data (i.e., a sampling interval of the difference data), a PWM generating circuit 34c configured to generate and output a driving signal such that the difference data becomes a driving signal for selected driving frequency, and a drive circuit 34d configured to flow current in a positive or negative direction in dependence on the driving signal so as to perform drive control of the rotational direction of the driving feature 32.

Furthermore, the pulse width comparison part 34b is subjected to velocity compensation such that the input position signal can be slightly altered in accordance with the velocity information and manner of rotation of the motor 32a.

Figure 2:
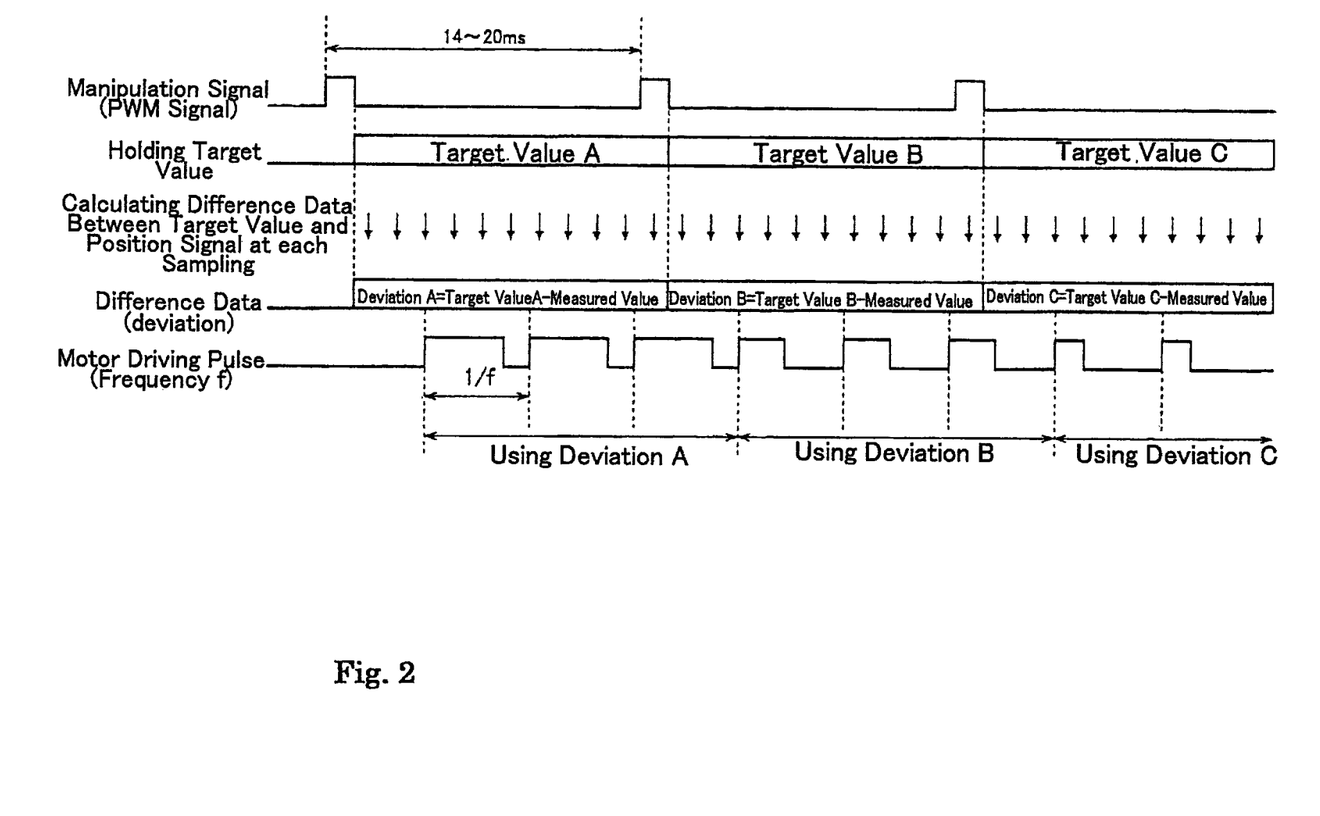
FIG. 2 is a waveform diagram showing PWM control process in the servo device.

Referring to FIG. 2, in the pulse width comparison part 34b the difference data can be obtained by holding a target value which corresponds to a pulse width of the handling signal from the transmitter 10, and calculating a difference (i.e., deviation) between the target value and a measured value, which corresponds to the pulse width of the position signal from the position signal generating part 34a, at each sampling. As shown, in a case where the target value as the handling signal is altered from a target value A to a target value B, and in turn from the target value B to a target value C, the difference data can be properly adjusted in accordance with the altered target value at next timing.

Figure 3:
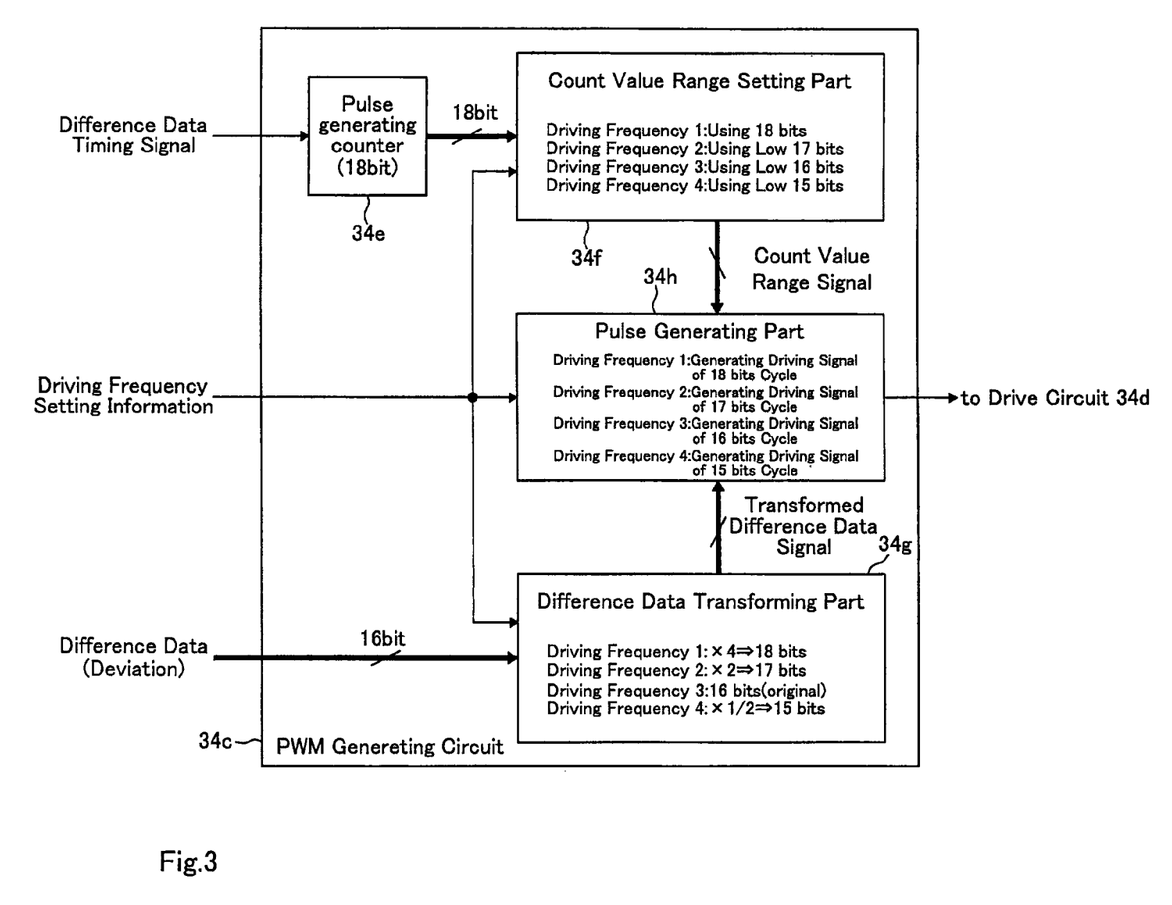
FIG. 3 is a functional block diagram showing the specification of PWM generating circuit in the servo device.

Next PWM generating circuit 34c which may be one of main part of the invention will be described in detail. Referring to FIG. 3, the PWM generating circuit 34 has a pulse generating counter 34e, a count value range setting part 34f, a difference data transforming part 34g, and a pulse generating part 34h, and is configured to transform and process the driving frequency of the diving signal in accordance with the difference data and the difference data timing signal obtained from the pulse width comparison part 34b such that handling sense or feeling desired by a user can be attained.

Figure 4:
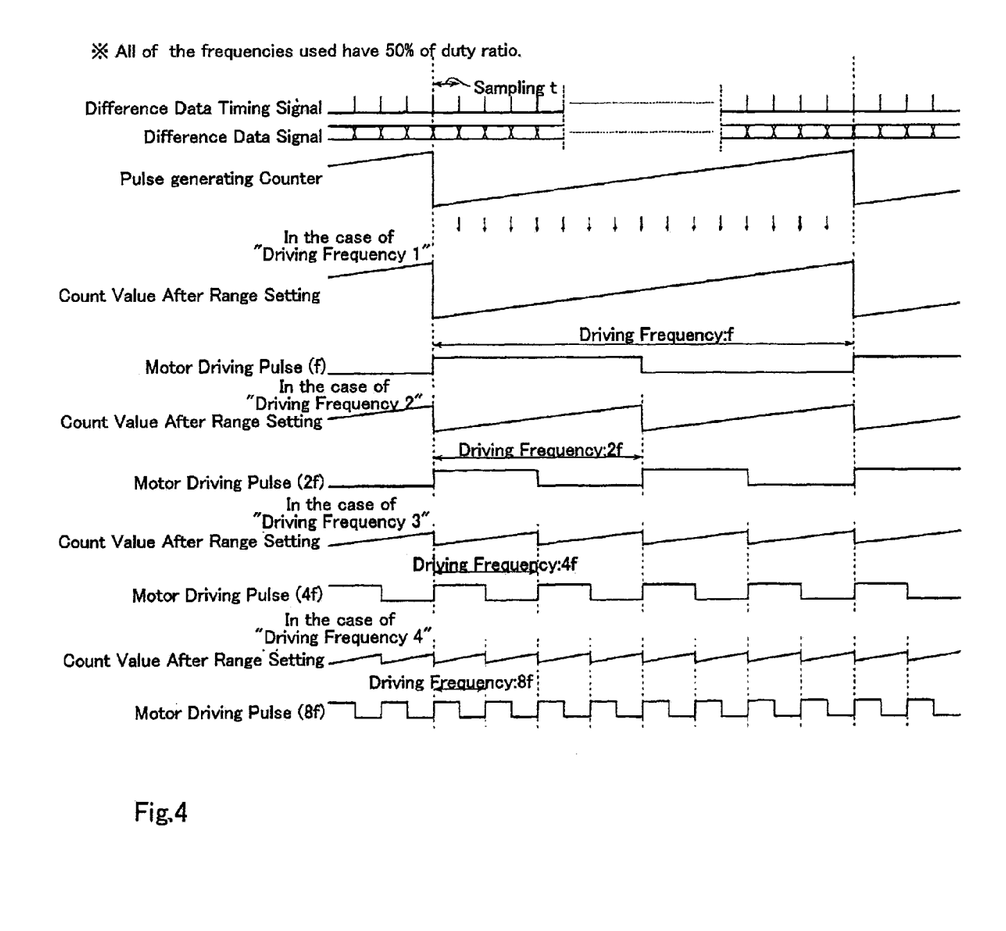
FIG. 4 is a waveform diagram of each driving frequency associated with the driving frequency transformation in the servo device.

The pulse generating counter 34e is configured to count up to the desired value (i.e., 18 bits) synchronously with the difference data timing signal obtained from the pulse width comparison part 34b as shown in FIG. 4 so as to output the count value at a count value range setting part 34f.

The count value range setting part 34f is configured to set which range of the count value is used among the count values (in the drawn embodiment, 18 bit counts) counted at the pulse generating counter 34e, in accordance with the currently selected driving frequency setting information as stored in the memory part 35. Moreover, the set content is output as a count value range signal at the pulse generating part 34h.

In other words, in a case where a user selects "Setting 2" in the transmitter 10, the count value range setting part 34f is configured to output the count value range signal, which instructs to use low 17 bits among 18 bits counted, at the pulse generating part 34h. The above instruction is based on the setting content of "Driving frequency 2" as stored in the memory part 35. In more detail, when the "Setting 2" is selected, "Driving frequency 2" is selected among the stored driving frequency setting information.

The difference data transforming part 34g is configured to transform the frequency of the difference data (in the drawn embodiment, a data of 16 bits) taken synchronously with the difference data timing signal obtained from the pulse width comparison part 34b, in accordance with the currently selected driving frequency setting information as stored in the memory part 35. The transformation can be performed by multiplying the frequency of the difference data by $2^n$ in which n is a positive or negative integer. The transformed signal is output as a transformed difference data signal at the pulse generating part 34h. Furthermore, as an example of the frequency transformation of the difference data, FIG. 4 can be referred to. Referring to FIG. 4, there are provided driving frequencies having 50% of duty ratio which corresponds to the period of time of the motor in "on" state through one cycle of the motor driving frequency. In detail, the period of time of the motor in "on" state means a period when the motor rotates. In a case where "Driving frequency 1" is selected, the selected driving frequency can be represented by "f". In this case, the frequency of "Driving frequency 2" can be "$2f$" via the transformation (i.e., doubling "f"). The frequency of "Driving frequency 3" can be "$4f$" via the transformation (i.e., multiplying f by four). The frequency of "Driving frequency 4" can be "$8f$" via the transformation (i.e., by multiplying f by eight).

In other words, in a case where "Setting 2" is selected by a user in the transmitter 10, "Driving frequency 2" is selected among the driving frequency setting information as stored. Accordingly, the data transforming part 34g is configured to output the transformed difference data signal (17 bits), which can be obtained by multiplying the difference data (16 bits) by two($2^1$), at the pulse generating part 34h in accordance with "Driving frequency 2" as stored in the memory part 35.

The pulse generating part 34h is configured to generate the driving signal (i.e., a driving pulse) allowing the driving frequency of the currently selected driving frequency setting information, in accordance with the currently selected driving frequency setting information as stored in the memory part 35, the count value range signal from the count value range setting part 34f, and the transformed difference data signal from the difference data transforming part 34g. The driving signal as thus obtained can be output at the drive circuit 34d.

In other words, when a user selects "Setting 2" in the transmitter 10, the pulse generating part 34h generates low 17 bits of the transformed difference data signal as a driving signal for actually driving the driving feature 32 (i.e., 17 bits cycle-driving signal) among the transformed difference data signal obtained from the difference data transforming part 34g, in accordance with the count value range signal from the count value range setting part 34f.

While the drawn embodiment is directed to an example of custom IC provided with the motor control part 34 which is mounted as a single LSI onto a single chip, the parts, of course, may be provided as separate circuits independently of each other.

Figure 5:
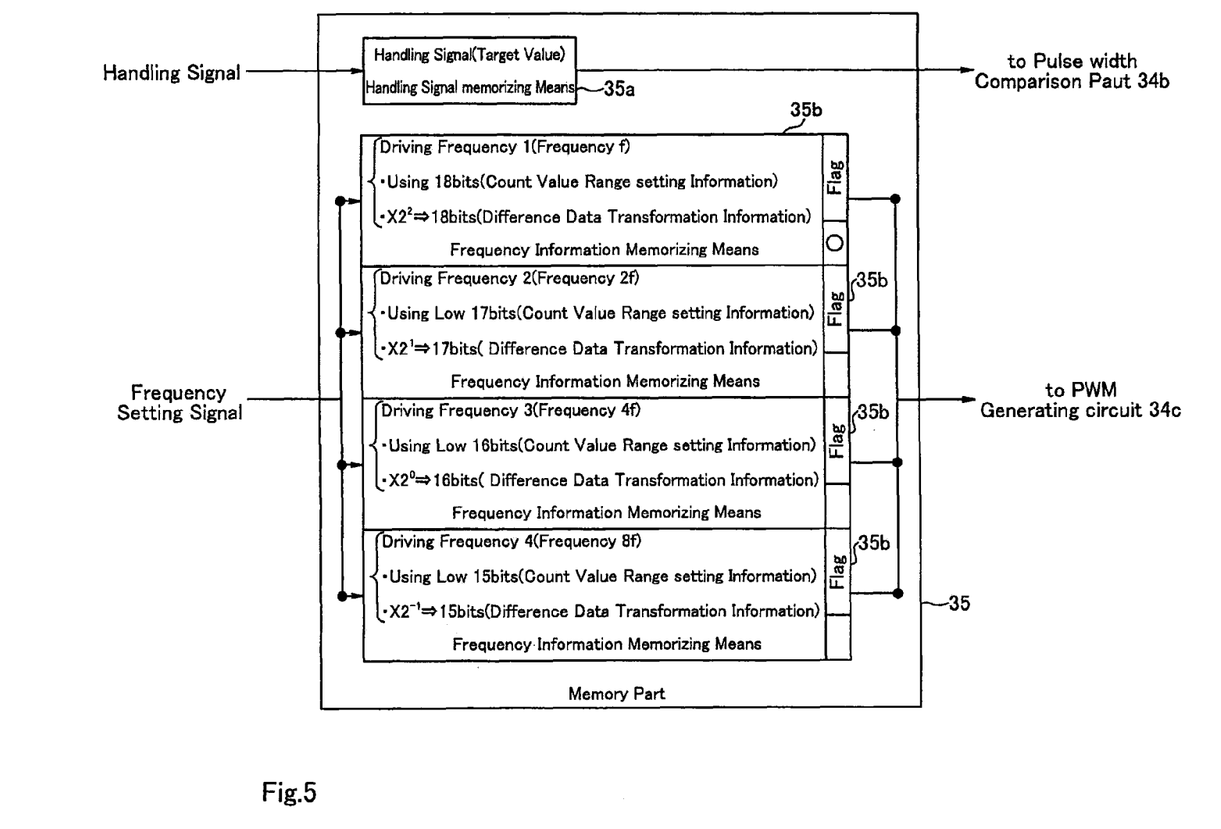
FIG. 5 illustrates a memory part of the servo device.

The memory part 35 may include rewritable non-volatile memory such a produce sold under the registered mark of "EEPROM". Referring to FIG. 5, the memory part 35 may includes a handling signal memorizing means 35a configured to store the handling signal, a plurality of driving frequency setting information which is predetermined in accordance with the specification of object to be handled, handling sense or feeling of a user, or the like, a frequency information memorizing means 35b configured to store the selected condition of the driving frequency setting information in accordance with the frequency setting signal. As such, the memory part 35 can store the updated frequency setting signal or handling signal from the signal processing part 33.

The handling signal memorizing means 35a corresponds to a memory area for storing the handling signal from the signal processing part 33. When the handling signal from the signal processing part 33 is input, the handling signal memorizing means 35a updates the target value used for obtaining the difference data in the pulse width comparison part 34b, and thus stores it.

The frequency information memorizing means 35b is a memory area in which the plurality of driving frequency setting information is divided into a plurality of sections, and is each stored in each of the sections. For reference, the plurality of driving frequency setting information is predetermined in accordance with the specification of object to be handled, handling sense or feeling of a user, or the like. In the drawn embodiment, there are four driving frequency setting information. Referring to FIG. 5, once the frequency setting signal from the signal processing part 33 is input, the driving frequency information corresponding to the input signal is selected by the frequency information memorizing means 35b. In FIG. 5, when a user selects "Setting 1" in the transmitter 10, a flag of "Driving frequency information 1" corresponding to the "Setting 1" is on. Furthermore, when the frequency setting signal corresponding to a driving frequency which is different from the currently selected driving frequency is input, the flag of the currently selected driving frequency setting information is deactivated, or in "off" state, and the flag of driving frequency setting information which corresponds to the newly input frequency setting signal is in "on" state.

The driving frequency setting information will be hereinafter described. The driving frequency setting information is a sort of processing information for transforming the difference data from the pulse width comparison part 34b into the selected driving frequency such that the desired handling sense or feeling can be obtained. In the driving frequency setting information, the count value range setting information the difference data transformation setting information are stored in associated with each other per a desired driving frequency.

The driving frequency as set for each driving frequency setting information corresponds to the frequency obtained from, for example, a prior experimentation such that the desired handling sense or feeling of a user is obtained. Referring to FIG. 5, in a case where "Driving frequency 1" is selected, the selected driving frequency is represented by frequency "f". As such, "driving frequency 2" can be represented by frequency "2f", "Driving frequency 3" can be represented by frequency "4f", and "Driving frequency 4" can be represented by frequency "8f". These frequencies are respectively stored in each section. Furthermore, "Driving frequency 1" to "Driving frequency 4" respectively correspond to "Setting 1" to "Setting 4" as selected by the transmitter 10.

<Count Value Range Setting Information>

The count value range setting information is configured to determine or instruct the range of the count value in which the transformed difference data signal is used among the count value (the number of bits) as counted by the pulse generating counter 34e, in accordance with the driving frequency of the currently selected driving frequency setting information. In the drawn embodiment, the count value as counted by the pulse generating counter 34e is 18 bits.

In the embodiment as shown in FIG. 5, "Driving frequency 1" uses 18 bits, "Driving frequency 2" uses the low 17 bits, "Driving frequency 3" uses the low 16 bits, and "Driving frequency 4" uses the low 15 bits. For reference, the desired count value is counted by the pulse generating counter 34e. In the drawn embodiment, the desired count value is 18 bits. Accordingly, in a case where a user selects "Setting 1" in the transmitter 10, "Driving frequency 1" is selected among the stored driving frequency setting information, and the count value range setting information is used as setting information for transforming the transformed difference data signal of 18 bits which is counted by the pulse generating counter 34e into the driving signal.

<Difference Data Transformation Setting Information>

The difference data transformation setting information is setting information for transforming the difference data from the pulse width comparison part 34b into the driving frequency of the currently selected driving frequency setting information in conformity with the count value range setting information. The above transformation (i.e., frequency transformation) can be performed by multiplying the frequency of the difference data by $2^n$ (n is a positive or negative integer).

Referring to FIG. 5, in a case where the original difference data is data of 16 bits, and the desired maximal count value counted by the pulse generating counter 34e is 18 bits, "Driving frequency 1" is set such that the (original) difference data is transformed into 18 bits by multiplying the difference data by four ($2^2$); "Driving frequency 2" is set such that the (original) difference data is transformed into 17 bits by multiplying the difference data by two ($2^1$); "Driving frequency 3" is set such that the original 16 bits) ($2^0$ is used; and "Driving frequency 4" is set such that the (original) difference data is transformed into 15 bits by multiplying the difference data by ½ ($2^{-1}$). Accordingly, in a case where a user selects "Setting 1" in the transmitter 10, "Driving frequency 1" is selected among the stored driving frequency setting information, and the difference data transformation setting information is used as setting information for transforming the input difference data (e.g., 16 bits) into the transformed difference data signal (e.g., 18 bits) by multiplying the difference data by four ($2^2$).

In the driving feature 32, the motor 32a is driven by current (or current magnitude) which can be controlled by the driving signal supplied from the driver circuit 34d, and the movable part can be moved by the rotation of the output axis 32c connected thereto via a decelerating feature 32b. In this regard, the driving feature 32 corresponds to a power transmission feature. Moreover, the rotational location of the output axis 32c can be detected by the position detecting part 32d which may be a device capable of detecting the position of the output axis 32c, including a potentiometer, a rotary encoder, a resolver or the like. The position information as detected by the position detecting part 32d can be output at the position signal generating part 34a.

<Handling Operation>

Next, serial handling operations of the servo device 30 to which the motor control circuit in accordance with the invention is mounted will be hereinafter described in detail. Specifically, there are provided descriptions with respect to the handling operations when the driving frequency are set, as well as when the object to be handled is handled or maneuvered.

<Handling Operation During Setting the Driving Frequency>

Firstly, a user can arbitrarily select "Setting 1" to "Setting 4" on the operation screen so as to properly operate the transmitter 10 and select the driving frequency corresponding to the desired handling sense or feeling of users for the object to be handled. Moreover, the frequency setting signal obtained in accordance with the setting content is transmitted as a control signal to the servo device 30 so as to drive the object with the selected driving frequency.

The servo device 30 is configured to output the control signal, which is received via the receiver 20, at the signal processing part 33. The signal processing part 33 specifies the frequency setting signal in view of the serial data of the control signal as input. After the signal processing part 33 generates the frequency setting signal, it temporarily holds or retains the frequency setting signal. Furthermore, the signal processing part 33 is configured to write the temporarily retained frequency setting signal in the frequency information memorizing means 35b of the memory part 35.

By way of the above, among the driving frequency setting information as stored in the frequency information memorizing means 35b the driving frequency setting information is selected that corresponds to the driving frequency as set by a user in the transmitter 10. See FIG. 3. The selected state as mentioned above can be also represented by the expression "flag on". The driving frequency transformation processing of the handling signal can be performed in accordance with the currently selected driving frequency setting information until the frequency setting signal is newly input.

<Handling Operation During Handling of the Object to be Handled>

When maneuvering or handling the object to be handled, a user transmits a handling signal corresponding to the manipulation signal obtained as a result of the operation in the transmitter 10 as the control signal to the servo device 30.

The servo device 30 is configured to output the control signal, which is received via the receiver 20, at the signal processing part 33. The signal processing part 33 specifies the handling signal from the pulse width of the control signal as input so as to generate the handling signal, and then to temporarily hold or retain the handling signal. Furthermore, the signal processing part 33 is configured to write the temporarily retained handling signal in the handling signal memorizing means 35a of the memory part 35.

The pulse width comparison part 34b is configured to calculate the difference data between the pulse width of the handling signal as stored in the handling signal memorizing means 35a and the pulse width of the position signal obtained from the position information based on the rotational position of the output axis 32c of the driving feature 32. The difference data thus obtained is output at the PWM generating circuit 34c.

In the PWM generating circuit 34c, the count value range setting part 34f is configured to read out the count value range signal of the currently selected driving frequency setting information from the frequency information memorizing means 35b. Moreover, the difference data transforming part 34g is configured to read out the difference data transformation setting information of the currently selected driving frequency setting information from the frequency information memorizing means 35b.

Next, once the difference data timing signal is input by the pulse width comparison part 34b, the pulse generating counter 34e is configured to count value(s) at a sampling interval of "t" which is synchronized with the difference data timing signal. After the counting is completed, the count completion information is output at the count value range setting part 34f.

Next, when the counting completion information is input by the pulse generating counter 34e, the count value range setting part 34f is configured to set which range of the count value is used among the count values counted at the pulse generating counter 34e, in accordance with the currently selected driving frequency setting information (i.e., reread information). Moreover, the set content is output as a count value range signal at the pulse generating part 34h. Furthermore, the difference data transforming part 34g is configured to transform the frequency of the difference data taken synchronously with the difference data timing signal obtained from the pulse width comparison part 34b in conformity with the count value range setting information, in accordance with the difference data transformation setting information (i.e., readout information).

The pulse generating part 34h is configured to generate the driving signal corresponding to the driving frequency of the currently selected driving frequency setting information, in accordance with the count value range setting information from the count value range setting part 34f and the transformed difference data signal from the difference data transforming part 34g, and to perform drive control of the motor 32a by outputting the generated driving signal at the driving feature 32.

As described previously, when the servo device 30 receives the frequency setting signal as a control signal through the receiver 20 from the transmitter 10, it select the information in conformity with the received frequency setting signal among the driving frequency setting information as stored in advance. Moreover, when the handling signal is input as the control signal by the transmitter 10, the servo device 30 is configured to transform the difference data taken synchronously with the difference data timing signal from the pulse width comparison part 34b into the selected driving frequency (i.e., frequency transformation processing). In addition, the servo device 30 is configured to generate the driving signal from the transformed difference data signal of the desired corresponding count value range, and to perform drive control of the driving feature 32 such that handling sense or feeling desired by a user can be attained.

Due to the above configuration, the handling signal from the transmitter 10 can be transformed into the driving frequency which is arbitrarily set in accordance with the desired handling sense or feeling of the user. Accordingly, in order to handle the object with the desired handling feeling or sense a separate servo device which corresponds to the preferences of the user is not needed for each of the moving parts. For example, by increasing the driving frequency, enough rotational torque can be obtained even with less pulse width change of the handling signal, and the moving part of the object can be actuated quickly at the desired location. Moreover, because the minimal driving pulse width for driving the motor 32*a* can be lessened, the motor 32*a* can be smoothly rotated, thereby promoting the rotational efficiency of the motor 32*a* and extending the lifetime of the motor 32*a*. By contraries, when the driving frequency is decreased, due to the rotational torque having less duty ratio enough starting torque cannot be obtained. However, the increased torque during low-speed rotation can be obtained in accordance with the preferences of the user.

Furthermore, even if there is any change in usage environment, the condition of the object to be handled, weather or the like, the driving properties or performances can be adjusted flexibly and easily without need for setting via a variety of setting devices such as PC.

In the above embodiment, the setting part 12 for setting the servo device 30 is formed independently of the operating part 11 for operating or manipulating the servo device 30. However, the operating part 11 can be also used as a setting operating means of the setting part 12 such that the setting content can be altered by operating part 11 (i.e., the operation or manipulation performed by the operating part 11) while the screen of the setting part 12 being viewed during the frequency setting.

Figure 6:
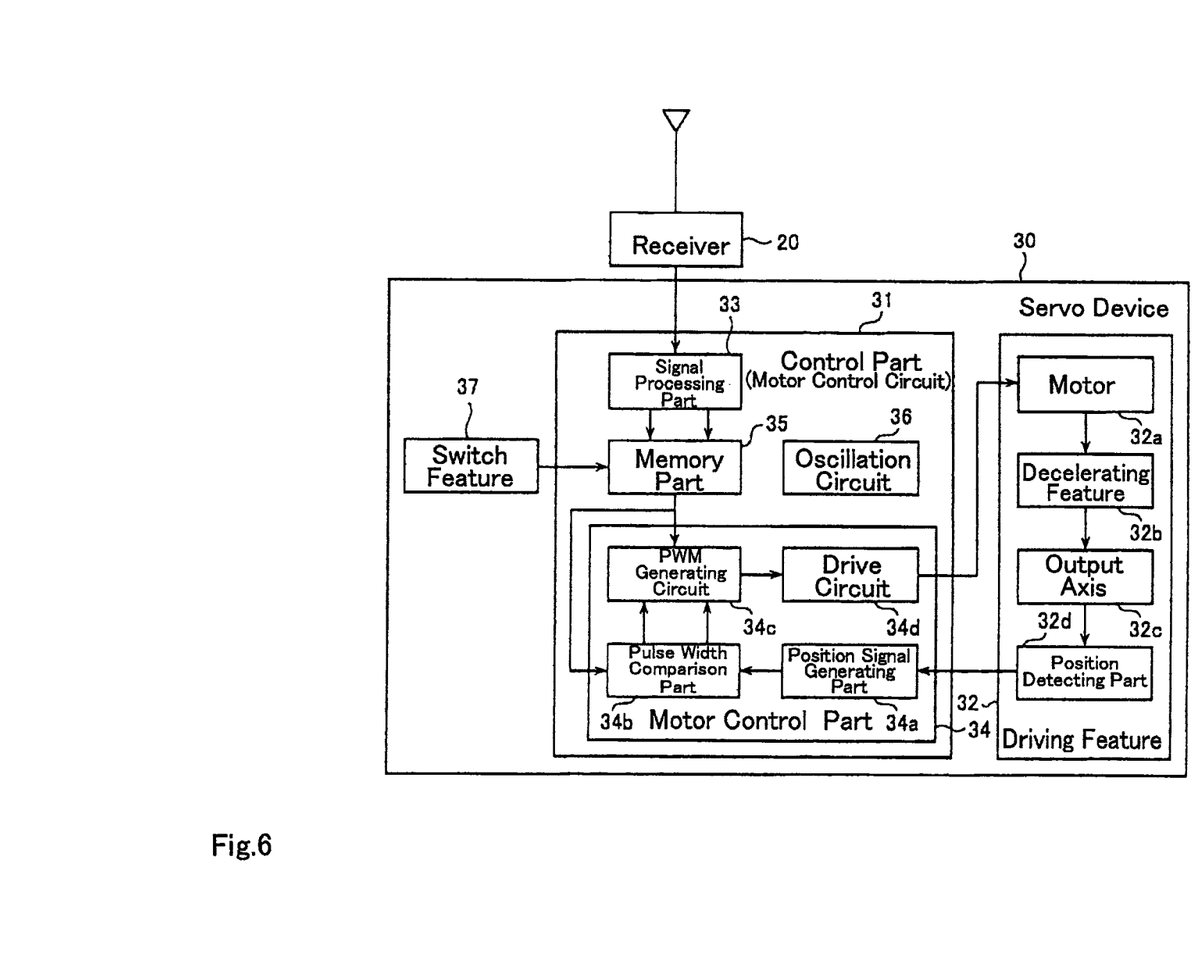
FIG. 6 is a functional block diagram showing another embodiment of the servo device in the same remote-control apparatus.

In the above embodiment, the driving frequency setting information as preliminarily stored in the memory part 35 can be selected by the frequency setting information from the transmitter 10. However, the invention is not limited to the above embodiment. For example, referring to FIG. 6, the servo device 30 is equipped with a switch feature 37 which corresponds to the driving frequency setting information as stored in the memory part 35, and the driving frequency which realizes or allows for the desired handling feeling or sense prior to the handling of the object to be handled can be selected at the flick of the switch.

The driving frequency setting information can be preliminarily stored in the memory part 35 via an external device such as a PC. However, the driving frequency setting information corresponding to the driving frequency used in place of the frequency setting signal from the transmitter 10 can be transmitted as setting information, and the servo device 30 can be thus set.

LIST OF REFERENCE NUMERAL

1 remote-control apparatus
10 transmitter
11 operating part
12 setting part
13 signal generating part
14 transmitting part
20 receiver
30 servo device
31 control part
32 driving feature (32*a:* motor; 32*b:* decelerating feature; 32*c:* output axis; 32*d:* position detecting part)
33 signal processing part
34 motor control part (34*a:* position signal generating part; 34*b:* pulse width comparison part; 34*c:* PWM generating circuit; 34*d:* drive circuit; 34*e:* pulse generating counter (part); 34*f:* count value range setting part; 34*g:* difference data transforming part; 34*h:* pulse generating part)
35 memory part (35*a:* handling signal memorizing means; 35*b:* frequency information memorizing means)
36 oscillation circuit
37 switch

What is claimed is:

1. A motor control circuit for generating a driving signal and performing drive control of a motor, the driving signal being generated by using difference data which is obtained by subtracting a pulse width of a position signal detected from a rotational position of an output axis of the motor from a pulse width of handling signal for controlling a driving amount of the motor, comprising:

a pulse generating counter configured to count up to a desired value synchronously with a difference data timing signal instructing a timing for updating the difference data;

a count value range setting part configured to output a count value range signal for setting the count value range to be used among the count value as counted by the pulse generating counter, in accordance with the currently selected driving frequency setting information among the driving frequency setting information for transforming the driving signal of the motor into a desired driving frequency;

a difference data transforming part configured to output a transformed difference data signal which is obtained by frequency transformation of the difference data, which is taken synchronously with the difference data timing signal, such that the driving frequency corresponding to the currently selected driving frequency setting information is obtained, and a pulse generating part configured to generate and output the transformed difference data signal as a driving signal corresponding to the driving frequency of the currently selected driving frequency setting information within the count value range as set by the count value range signal from the count value range setting part.

2. The motor control circuit according to claim 1, wherein the driving frequency setting information includes (i) a count value range setting information instructing the count value range in which the transformed difference data signal is used in accordance with the selected driving frequency among the count value as counted synchronously with the difference data timing signal, and (ii) a difference data transformation setting information for frequency transformation of the difference data by multiplying the difference data by $2^n$ (wherein n is a positive or negative integer) such that the driving frequency as selected in conformity with the count value range setting information is obtained, and wherein (i) the count value range setting information and (ii) the difference data transformation setting information are stored in associated with each other with respect to each desired frequency.

3. A servo device, comprising a control part configured to receive a handling signal corresponding to a desired operation amount of an operating part of a transmitter, and to transform the handling signal to a driving signal so as to perform drive control of a driving feature, in which the control part comprises:

a pulse generating counter configured to count up to a desired value of difference data synchronously with a difference data timing signal instructing a timing for updating the difference data, the difference data being obtained by subtracting a pulse width of a position signal detected from a rotational position of an output axis of the driving feature from a pulse width of handling signal;

a count value range setting part configured to output a count value range signal for setting the count value range to be used among the count value as counted by the pulse generating counter, in accordance with the currently selected driving frequency setting information among the driving frequency setting information for transforming the driving signal of the motor into a desired driving frequency;

a difference data transforming part configured to output a transformed difference data signal which is obtained by frequency transformation of the difference data, which is taken synchronously with the difference data timing signal, such that the driving frequency corresponding to the currently selected driving frequency setting information is obtained, and a pulse generating part configured to generate and output the transformed difference data signal as a driving signal corresponding to the driving frequency of the currently selected driving frequency setting information within the count value range as set by the count value range signal from the count value range setting part.

4. The servo device according to claim 3, wherein the driving frequency setting information includes (i) a count value range setting information instructing the count value range in which the transformed difference data signal is used in accordance with the selected driving frequency among the count value as counted synchronously with the difference data timing signal, and (ii) a difference data transformation setting information for frequency transformation of the difference data by multiplying the difference data by $2^n$ (wherein n is a positive or negative integer) such that the driving frequency as selected in conformity with the count value range setting information is obtained, and wherein (i) the count value range setting information and (ii) the difference data transformation setting information are stored in associated with each other with respect to each desired frequency.

* * * * *